(12) United States Patent
Choi et al.

(10) Patent No.: US 6,504,292 B1
(45) Date of Patent: Jan. 7, 2003

(54) FIELD EMITTING DEVICE COMPRISING METALLIZED NANOSTRUCTURES AND METHOD FOR MAKING THE SAME

(75) Inventors: Kyung Moon Choi, Scotch Plains, NJ (US); Sungho Jin, Millington, NJ (US); Gregory Peter Kochanski, Dunellen, NJ (US); Wei Zhu, Warren, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/365,059

(22) Filed: Jul. 30, 1999

Related U.S. Application Data

(60) Provisional application No. 60/144,547, filed on Jul. 15, 1999.

(51) Int. Cl.[7] .............................. H01J 1/13; H01J 1/00; H01J 19/02
(52) U.S. Cl. ...................... 313/310; 313/309; 313/311; 313/326; 313/336; 313/351; 313/346 R
(58) Field of Search .................... 313/309, 311, 313/495, 496, 497, 346 R, 336, 351; 445/24, 25, 50, 51

(56) References Cited

U.S. PATENT DOCUMENTS

| | | | |
|---|---|---|---|
| 5,709,943 A | * | 1/1998 | Coleman et al. ............ 428/378 |
| 5,773,921 A | | 6/1998 | Keesmann et al. .......... 313/309 |
| 5,872,422 A | | 2/1999 | Xu et al. ..................... 313/311 |
| 6,062,931 A | * | 5/2000 | Chuang et al. ................ 445/24 |
| 6,231,744 B1 | * | 5/2001 | Ying et al. ................... 205/324 |
| 6,239,547 B1 | * | 5/2001 | Uemura et al. .............. 313/495 |
| 6,250,984 B1 | * | 6/2001 | Jin et al. ..................... 313/495 |
| 6,277,318 B1 | * | 8/2001 | Bower et al. ................ 264/346 |
| 6,283,812 B1 | * | 9/2001 | Jin et al. ....................... 445/24 |
| 6,286,226 B1 | * | 9/2001 | Jin ............................... 33/706 |

FOREIGN PATENT DOCUMENTS

| | | | | |
|---|---|---|---|---|
| WO | WO 200008445 | * | 2/2000 | ............. G01J/3/44 |

* cited by examiner

Primary Examiner—Nimeshkumar D. Patel
Assistant Examiner—Mariceli Santiago
(74) Attorney, Agent, or Firm—Lowenstein Sandler PC

(57) ABSTRACT

In accordance with the invention, an improved conductive nanostructure assembly comprises an array of metallized nanostructures disposed on a conductive substrate. The substrate can also be metallized. Such assemblies provide continuous electron transport from the substrate to the tips of the nanostructures. Several ways of making such assemblies are described along with several devices employing the assemblies.

10 Claims, 8 Drawing Sheets

FIELD EMITTING DEVICE COMPRISING METALLIZED NANOSTRUCTURES AND METHOD FOR MAKING THE SAME

CROSS REFERENCE TO RELATED APPLICATIONS

This application claims the benefit of U.S. Provisional Application No. 60/144,547, of identical title filed by the present inventors on Jul. 15, 1999.

FIELD OF INVENTION

This invention pertains to nanoscale conductive devices and, in particular, to metallized nanostructures particularly useful as electron field emitters and nanoscale conductors.

BACKGROUND OF THE INVENTION

Field emitting devices are useful in a wide variety of applications. A typical field emitting device comprises a field emitting assembly composed of a cathode and a plurality of field emitter tips. The device also typically includes a grid spaced relatively closely to the emitter tips and an anode spaced relatively farther from the tips. Voltage induces emission of electrons from the tips, through the grid, toward the anode. Applications include microwave tube devices, flat panel displays, klystrons and traveling wave tubes, ion guns, electron beam lithography, high energy accelerators, free electron lasers, and electron microscopes and microprobes. See, for example, *Semiconductor International*, December 1991, p.46; C. A. Spindt et al., *IEEE Transactions on Electron Devices*, vol. 38, pp. 2355 (1991); I. Brodie and C. A. Spindt, *Advances in Electronics and Electron Physics*, edited by P. W. Hawkes, vol. 83, pp. 1 (1992); and J. A. Costellano, *Handbook of Display Tehnology*, Academic Press, New York, pp. 254 (1992), all of which are incorporated herein by reference.

A conventional field emission flat panel display comprises a flat vacuum cell having a matrix array of microscopic field emitters formed on a cathode and a phosphor coated anode disposed on a transparent front plate. An open grid (or gate) is disposed between cathode and anode. The cathodes and gates are typically intersecting strips (usually perpendicular) whose intersections define pixels for the display. A given pixel is activated by applying voltage between the cathode conductor strip and the gate conductor. A more positive voltage is applied to the anode in order to impart a relatively high energy (400–5,000 eV) to the emitted electrons. For additional details see, for example, the U.S. Pat. Nos. 4,940,916; 5,129,850; 5,138,237 and 5,283,500, each of which is incorporated herein by reference.

A variety of characteristics are advantageous for field emitting assemblies. The emission current is advantageously voltage controllable, with driver voltages in a range obtainable from "off the shelf" integrated circuits. For typical CMOS circuitry and typical display device dimensions (e.g. 1 $\mu$m gate-to-cathode spacing), a cathode that emits at fields of 25 V/$\mu$m or less is generally desirable. The emitting current density is advantageously in the range of 1–10 mA/cm$^2$ for flat panel display applications and >100 mA/cm$^2$ for microwave power amplifier applications. The emission characteristics are advantageously reproducible from one source to another and advantageously stable over a long period of time (tens of thousands of hours). The emission fluctuations (noise) are advantageously small enough to avoid limiting device performance. The cathode should be resistant to unwanted occurrences in the vacuum environment, such as ion bombardment, chemical reaction with residual gases, temperature extremes, and arcing. Finally, the cathode manufacturing is advantageously inexpensive, e.g. devoid of highly critical processes and adaptable to a wide variety of applications.

Previous cathode materials are typically metal (such as Mo) or semiconductor (such as Si) with sharp tips. While useful emission characteristics have been demonstrated for these materials, the control voltage required for emission is relatively high (around 100 V) because of their high work functions. The high control voltage increases damage due to ion bombardment and surface diffusion on the emitter tips and necessitates high power densities to produce the required emission current density. The fabrication of uniform sharp tips is difficult, tedious and expensive, especially over a large area. In addition, these materials are vulnerable to deterioration in a real device operating environment involving ion bombardment, chemically active species and temperature extremes.

Diamond emitters and related emission devices are disclosed, for example, in U.S. Pat. Nos. 5,129,850, 5,138, 237, 5,616,368, 5,623,180, 5,637,950 and 5,648,699 and in Okano et al., *Appl. Phys. Lett.* vol. 64, p. 2742 (1994), Kumar et al., *Solid State Technol.* vol. 38, p. 71 (1995), and Geis et al., *J. Vac. Sci. Technol.* vol. B14, p. 2060 (1996), all of which are incorporated herein by reference. While diamond field emitters have negative or low electron affinity, the technology has been hindered by emission non-uniformity, vulnerability to surface contamination, and a tendency toward graphitization at high emission currents (>30 mA/cm$^2$).

Nanoscale conductors ("nanoconductors") have recently emerged as potentially useful electron field emitters. Nanoconductors are tiny conductive nanotubes (hollow) or nanowires (solid) with a very small size scale of the order of 1.0–100 nm in diameter and 0.5–100 $\mu$m in length. Nanoconductors typically have high aspect ratios (>1,000) and small tip radii of curvature (1–50 nm). These geometric characteristics, coupled with the high mechanical strength and chemical stability, make nanoconductors attractive electron field emitters. Carbon nanotube emitters are disclosed, for example, by T. Keesmann in German Patent No. 4,405, 768, and in Rinzler et al., *Science*, vol. 269, p.1550 (1995), De Heer et al., *Science*, vol. 270, p. 1179 (1995), Saito et al., *Jpn. J. Appl. Phys.* Vol. 37, p. L346 (1998), Wang et al., *Appl. Phys. Lett.*, vol. 70, p. 3308, (1997), Saito et al., *Jpn. J. Appl. Phys.* Vol. 36, p. L1340 (1997), Wang et al., *Appl. Phys. Lett.* vol. 72, p 2912 (1998), and Bonard et al., *Appl. Phys. Lett.*, vol. 73, p. 918 (1998), all of which are incorporated herein by reference. Other types of nanoconductors such as Si or Ge semiconductor nanowires can also be useful because of the electrical field concentrating, high-aspect-ratio geometry, although they tend to have an outer surface of insulating oxide. See Morales et al. *Science*, Vol. 279, p. 208, (1998). Nonconductive materials form similar nanotubes and nanowires with similar favorable geometric features but are not presently used for emission or conduction. The term "nanostructures" will be used herein to encompass nanotubes and nanowires whether conductive or nonconductive.

Nanostructures are typically grown in the form of randomly oriented, needle-like or spaghetti-like powders that are not easily or conveniently incorporated into field emitter devices. Due to this random configuration, the electron emission properties are not fully utilized or optimized. Ways to grow nanostructures in an oriented fashion on a substrate are disclosed in Ren et al., *Science*, Vol. 282, p. 1105 and Fan et al., *Science,* Vol. 283, p. 512, both of which are incorporated herein by reference.

In the design and fabrication of efficient and reliable conductors and electron field emitters, a stable electrical continuity from the source of electrical power to the electron emitting tips is important. A combination of two conditions, i.e. that the nanostructures conduct along their entire length and that the substrate surface exhibit continuous conductivity, should be met to ensure a continuous transport of electrons to the field-emitting tips. (A third condition of electrical continuity from underneath the substrate to the top surface of the substrate should also be met if the electrical contact from the power supply is to be made on the bottom surface of the substrate). However, there are occasions when one or both conditions are not met.

Carbon nanotubes are the preferred nanostructures for electron field emission. FIGS. 1(*a*)–1(*c*) are schematic molecular models showing various known configurations of carbon nanotubes. Single-wall nanotubes can be metallic with the "armchair" configuration of the carbon atoms C (FIG. 1(*c*)). See M. S. Dresselhous et al., *Science of Fullerines and Carbon Nanotubes,* Chapter 19, p. 758 and p. 805–809, Acdemic Press, San Diego, 1996. It is also known that the nanotube atomic arrangements and hence the electrical properties sometimes vary drastically along the length of a single tubule. See P. G. Collins, et al., *Science,* Vol. 278, p. 100 (Oct. 3, 1997). Thus efficient electron transport from the cathode substrate to the emitting tip is not always guaranteed.

Furthermore, nanostructures can be comprised of nonconductive material or the substrate itself can be electrically insulating, e.g. a porous ceramic substrate. See Li et al., *Science,* Vol. 274, p. 1701 (Dec. 6, 1996). In such a case, there will be a discontinuity in electron transport.

Accordingly there is a need for a nanostructure assembly that provides continuous electron transport from the cathode power supply to the field-emitting tips and a need for a method of making such an assembly.

SUMMARY OF THE INVENTION

In accordance with the invention, an improved conductive nanostructure assembly comprises an array of metallized nanostructures disposed on a conductive substrate. The substrate can also be metallized. Such assemblies provide continuous electron transport from the substrate to the tips of the nanostructures. Several ways of making such assemblies are described along with several devices employing the assemblies.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

DETAILED DESCRIPTION

This disclosure is divided into two parts. Part I describes the problem of poor electron transport in some conventional nanostructure assemblies and discloses metallized nanostructure assemblies as a solution to these problems, along with several methods of making the assemblies. Part II describes improved devices using metallized nanostructure assemblies and methods for making the improved devices.

I. Metallized Nanostructure Assemblies for Improved Electron Transport

Figure 1A:
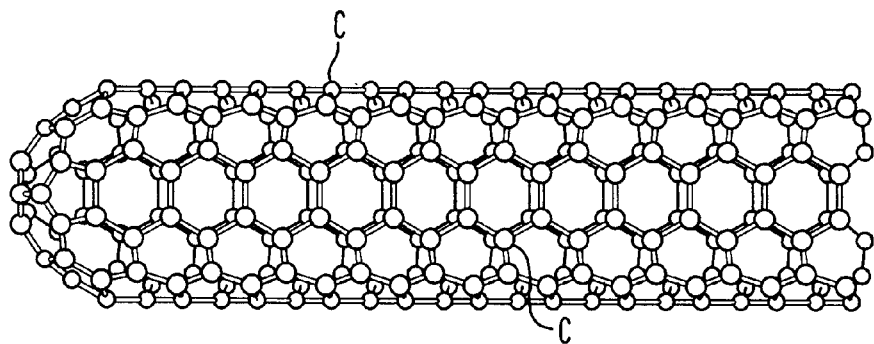
FIGS. 1A, 1B and 1C illustrate different molecular configurations of carbon nanotubes.
Figure 1B:
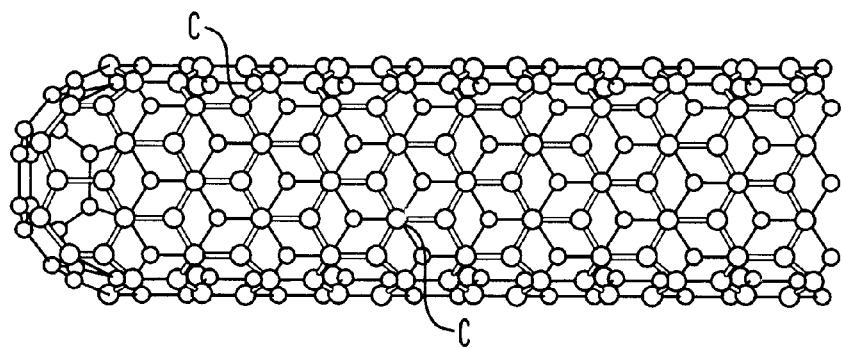
Figure 1C:
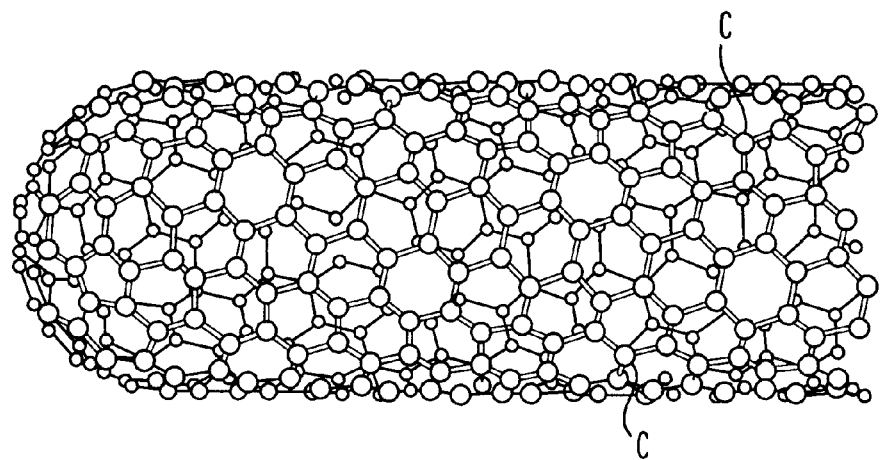
Figure 2A:
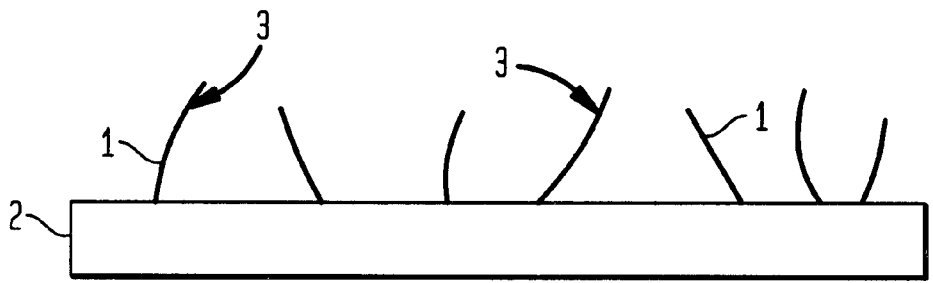
FIGS. 2A, 2B and 2C show forms of nanostructures grown on a substrate.
Figure 2B:
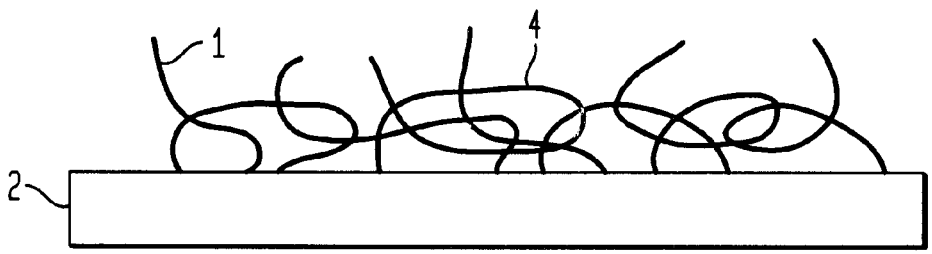
Figure 2C:
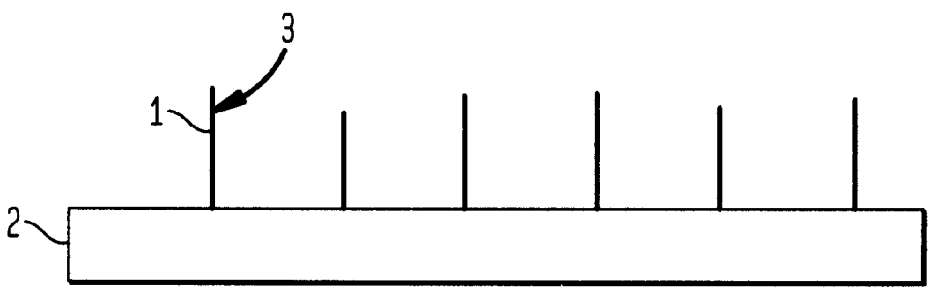

Referring to the drawings, FIGS. 2(*a*)–(*c*) schematically show some typical forms of nanostructures 1 grown or deposited on a substrate 2, e.g., by chemical vapor deposition. The inventive processes and structural modifications apply to these types of configurations when they exhibit electrical transport properties not suitable for continuous supply of electrons from the substrate 2 to the emitting tips 3. Here, at least a portion of either the nanostructure 1 or the substrate 2 or both are electrically insulating or poorly conductive so that the continuous supply of electrons to the emitting tips 3 is interrupted.

The FIG. 2(*a*) structure arises, for example, when relatively short carbon nanotubes are locally nucleated and grown by catalytic nucleation and decomposition of carbon-containing chemical vapor precursors without providing active alignment mechanisms.

The FIG. 2(*b*) configuration of nanostructures 1 typically arises either when the nanostructures of FIG. 2(*a*) are allowed to grow further during the chemical vapor decomposition resulting in an entangled mass 4. It arises, for example, when carbon nanotubes are synthesized by laser ablation or the arc method. The loose ends of the nanostructures near the top, not confined by the entanglement, tend to stand up perpendicular to the substrate surface when an electric field is applied for field emission.

The aligned configuration of FIG. 2(*c*) typically arises when carbon nanotubes are grown using active aligning mechanisms. These mechanisms include use of an applied electric field during growth, use of composition or temperature gradients during growth, or growth from catalytic agents in vertically recessed pores in the substrate. The desired degree of the nanotube alignment for the inventive emitter structures devices is such that the average deviation from the axis perpendicular to the substrate surface is less than 25 degrees and preferably less than 10 degrees.

In accordance with the invention, assemblies which have poorly conducting nanostructures or substrate surface regions are metallized by depositing a thin layer of conductive material to provide continuous electron transport. The desirable conductive coating material comprises at least one metallic material, for example, Mo, W, Nb, Ta, Zr, Hf, Re, Ir, Os, Co, Ni, Fe, Au, Ag, Pt, Pd, Rh, or their alloys. The use of noble metals such as Au, Pt, Pd or their alloys provides an added benefit of stability and reliability against oxidation or corrosion during handling, storage, and assembly. The use of high melting point metals or alloys (typically melting point $\geq 1400°$ C., advantageously $\geq 1800°$ C. and preferably $\geq 2200°$ C.) is desirable. Refractory metals such as Mo, W, Ta and Hf are advantageous because they minimize the undesirable diffusion of low melting point metal atoms to the emitting tips of the nanostructures or to nearby IC circuit components. In carbon nanotubes, high melting point metals at the emitter tips also minimize the possibility of carbon atoms unraveling from the structure under high local fields.

Figure 3A:
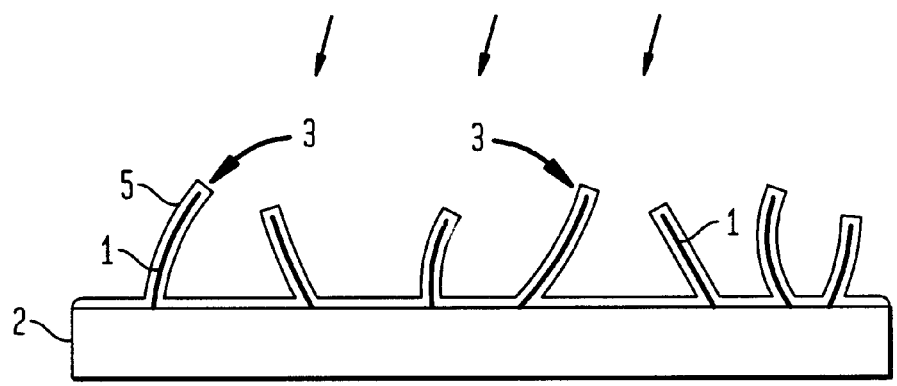
FIGS. 3A, 3B and 3C schematically illustrate applying a metal coating by different techniques of physical vapor deposition.
Figure 3B:
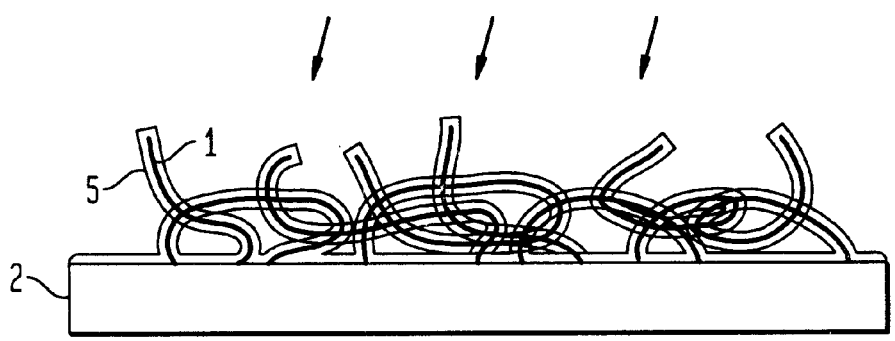
Figure 3C:
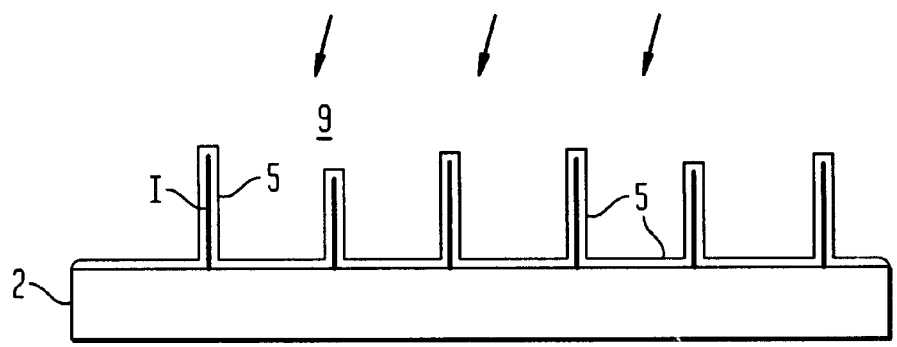

As shown in FIGS. 3(a) to 3(c), the metal coating 5 can be applied by different known techniques of physical vapor deposition such as sputtering, evaporation or ion beam process, chemical vapor deposition by decomposing metal-containing precursor gas, or electrochemical deposition such as electroless or electrolytic coating. The desired average thickness of the metal film coating on nanostructures, such as carbon nanotubes, and on the substrate is in the range of 0.2–100 nanometer, and preferably in the range of 0.5–20 nanometers. The metal coating 5 does not necessarily have to cover 100% of the surface of the nanostructures 1 or the substrate 2, as long as continuous paths for electrical conduction along the length is provided to most of the emitting tips 3. For the purpose of exceeding the percolation limit for continuity of the conducting path, the surface area coverage by the metallic coating is desirably at least about 30%, although a much lower fraction of area coverage is also acceptable if the metal deposition pattern is anisotropic, e.g., with at least ~5%. In the case of line-of-sight metal deposition such as sputtering, evaporation or ion-beam deposition, the substrate may be rotated, if desired, to overcome the shadowing effect, to ensure sufficient area coverage and to provide symmetry. The result is an assembly 9 of metallized nanostructures on a metallized substrate.

Symmetry of the metal coating on the surface of the nanostructures is advantageous in reducing the possibility of nanostructure bending or curling due to deposition-induced interfacial stress. Such bending or curling is also reduced by the use of relatively stiff nanostructures such as multiwall nanotubes or bundled single-wall nanotubes. Particular care to avoid stress should be taken in the case of smaller diameter nanostructures (diameter<10 nm).

Figure 4A:
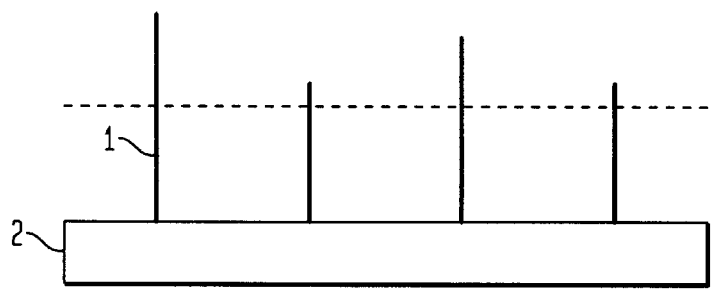
FIGS. 4A and 4B show trimming the nanostructures (FIG. 4A) before the metal coating is applied (FIG. 4B)

As illustrated in FIG. 4(a), the height of the grown nanostructures may not be uniform depending on the nature of the synthesis technique used. The desired uniformity of the height (or length) of the aligned nanostructures for field emitter structures is with less than 10% variation from the average height of the nanostructures. For electron field emitter devices especially triode designs incorporating an electron-extracting grid (also called a gate) separated from the emitter (cathode) surface by a small gap, e.g., of the order of micrometers or less, the uniformity of the emitter height is more important, for example, with the average height variation of less than 2.0 $\mu$m, preferably less than 0.8 $\mu$m, and even more preferably less than 0.2 $\mu$m. This uniformity is needed in order to avoid electrical shorting by the taller nanowires present and also to achieve uniform and efficient, low-field emission from most of the nanowire emitter tips. The variation of the tip-to-gate gap directly translates to the magnitude of the electric field applied for a given voltage between the cathode and the grid. The carbon nanotubes grown by CVD processes such as described in articles by Ren et al. in Science, vol. 282, p. 1105, 1998 and by Li, et al. do not provide such a submicron-scale height-uniformity desired in field emission devices.

Figure 4B:
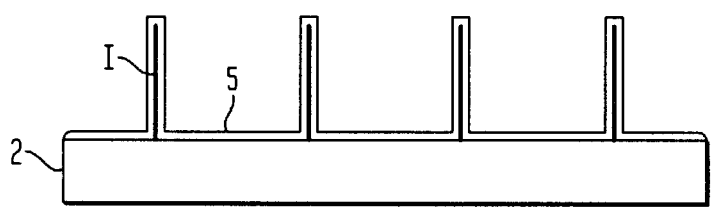

An exemplary height-equalization step is schematically illustrated in FIG. 4(b). Equalization can be achieved by truncation using a laser beam, a hot, blade, or mechanical polishing. This equalization is preferably carried out before metal film deposition.

Figure 5A:
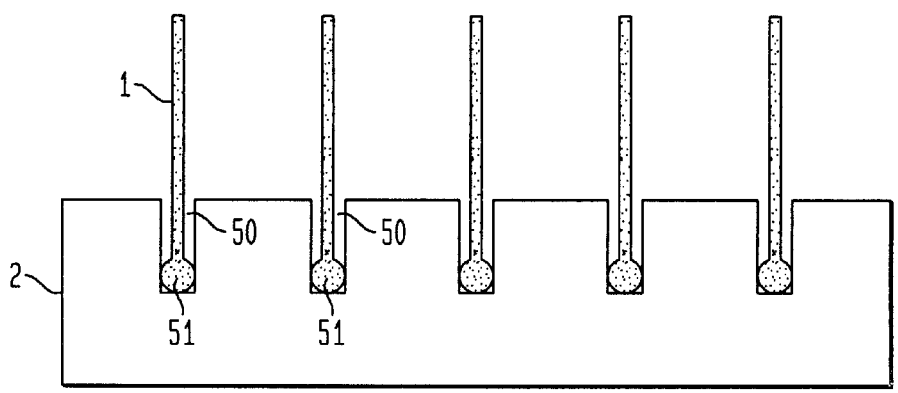
FIGS. 5A and 5B illustrate growing the nanostructures on porous substrates (FIG. 5A) before the metal coating is applied (FIG. 5B)
Figure 5B:
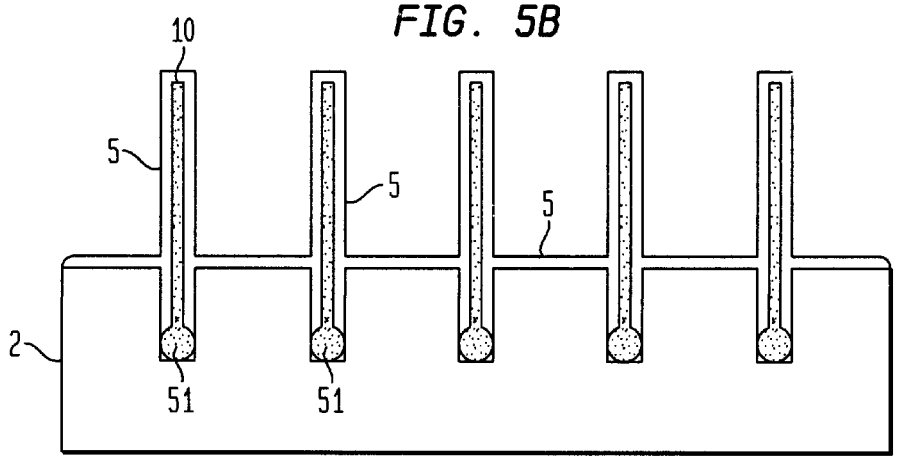

In addition to the previously discussed CVD method for aligned growth of nanostructures, such aligned structures can also be grown from a porous ceramic or porous semi-conductor substrate as illustrated in FIG. 5(a). See Li, et al. cited above, and Fan et al., Science, Vol. 283, p. 512 (1999). Recessed pores 50 containing nanoparticles of nucleating catalyst are useful in synthesizing aligned carbon nanowires by CVD processing. These porous substrates, such as zeolite, mesoporous silicate, organic-inorganic hybrid silicate glass, and porous silicon, are often electrically insulating or poorly conducting. As shown in FIG. 5(b) the metallizing coating 3 provides continuous paths for electron transport to the field-emitting tips.

Figure 6A:
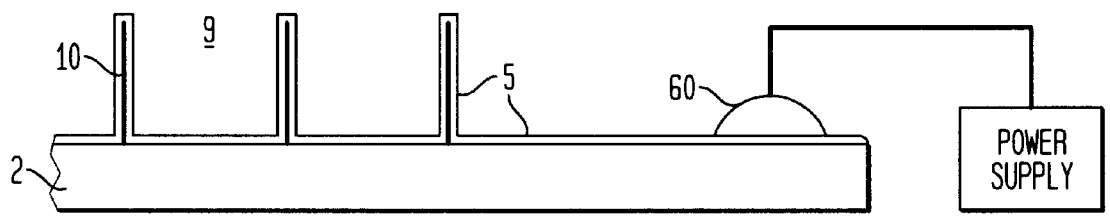
FIGS. 6A, 6B and 6C show arrangements for making electrical contact with the emitter assembly.
Figure 6B:
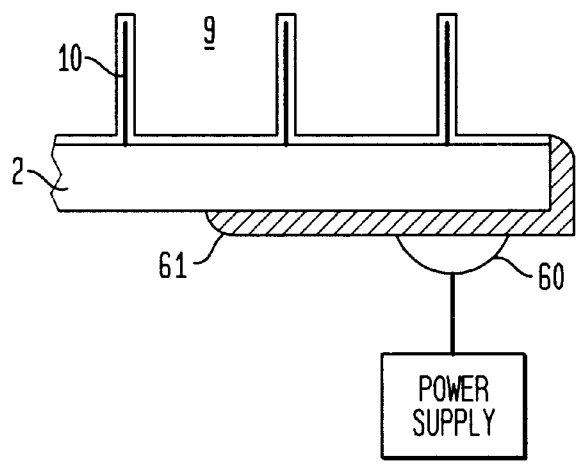
Figure 6C:
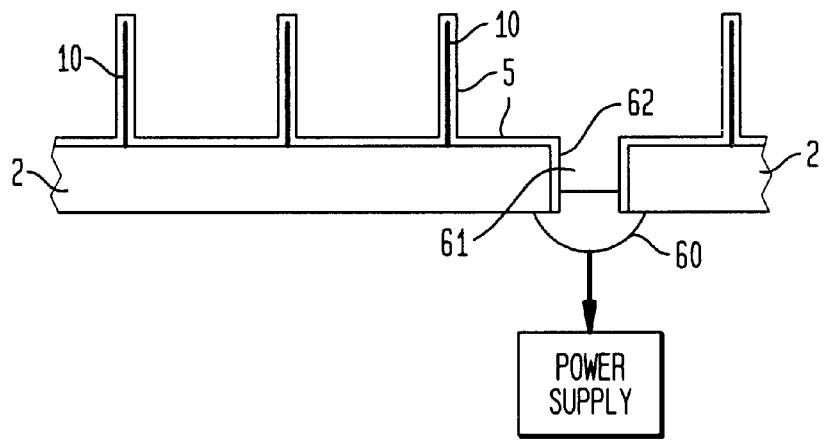

For certain field emitter designs, the electrical contact 60 to the emitter assembly 9 may be made onto the top of the metallized substrate 2, as illustrated in FIG. 6(a). In other types of designs, it may be more convenient to make the contact to the backside of the substrate. If the substrate used possess metallic conductivity, then such contacts to the backside is easily made for electron transport to the emitting tips. If, however, the substrate is insulating (or poorly conducting), it is desirable to precoat at least the back and side surfaces of the substrate with conductive layer 61. Alternatively as shown in FIG. 6(c), the substrates can be processed to have at least one and desirably a multitude of via holes 62 which are either precoated with metal 5 (e.g., by electroless plating, electroplating, or physical or chemical deposition of a metal) or are metallized during the same processing step of metallizing the nanostructures the and the upper surface of the substrate. The bottom part of the conducting via holes (e.g., metallized with Cu, Au, or Ni) includes a contact 60 electrically connected to the power supply and allows short-distance, low-resistance electron transport directly from underneath the substrate to the metallized nanostructures 10.

Electron field emission is enhanced when the geometrical feature of the emitter is made small, due to the concentration of electrical field near sharp tips. The small diameter nanostructures, e.g., as small as ~1 nm, provides an effective field concentrating feature. However, the ends of the nanostructures provide even smaller radii of curvature for enhanced field concentration and electron emission. The average nanostructure diameter is in the range of about 1.0–200 nm depending on whether the nanostructures are single-walled, multiwalled or bundled-single-wall types. (Single wall nanostructures tend to exhibit a typical diameter on the order of 1 to 5 nm, and are often in the form of a bundle of dimension 5–50 nm in diameter due Van Derwall's attraction. Multi-wall nanostructures tend to exhibit a typical diameter on the order of 10 to 50 nm. The aspect ratio for both types is typically 100 to 10,000.) The average height of the nanostructures from a supporting substrate is typically in the range of 0.01–1000 $\mu$m, preferably in the range of 0.1–100 $\mu$m, even more preferably in the range of 0.5–20 $\mu$m.

Nanowires of Si or Ge, as disclosed by Morales et al. cited above, may also be used for field emitters as they possess very high aspect ratio with small diameters in the range of e.g., 5–50 nanometers. The metallizing of such nanostructures is essential to make them emit electrons in a sustained manner, as the nanostructures tend to be covered with an insulating surface layer such as $SiO_2$ which would prevent the electron transport from the power source to the emitter tip.

Yet other types of nanostructures useful for efficient field emitters are various oxide nanowires or whiskers such as $Al_2O_3$, MgO, ZrO, $TiO_2$, CaO, various nitride nanowires such as AlN, BN, SiN, TiN, various carbide nanowires such as SiC, TiC, WC, ZrC, NbC, or other types of insulating or poorly conducting ceramic nanowire such as the mixed ceramics or borides. These high-aspect-ratio nanostructures can be made to emit electrons at relatively low electric fields by metallizing them according to the invention.

II. Improved Field Emitting Devices

The improved assemblies in accordance with the invention (hereinafter called "nanowire assemblies") are useful for variety of devices, including microwave vacuum tube amplifier devices and flat panel field emission display devices. Because efficient electron emission at low applied voltages is typically improved by the presence of accelerating gate electrode in close proximity to the emitting source (typically about 1–10 µm distance), it is advantageous to have numerous gate apertures to enhance the capability of the emitter structure. Specifically, a fine-scale, micron-sized gate structure with numerous gate apertures is advantageous for attaining high emission efficiency.

Figure 7:
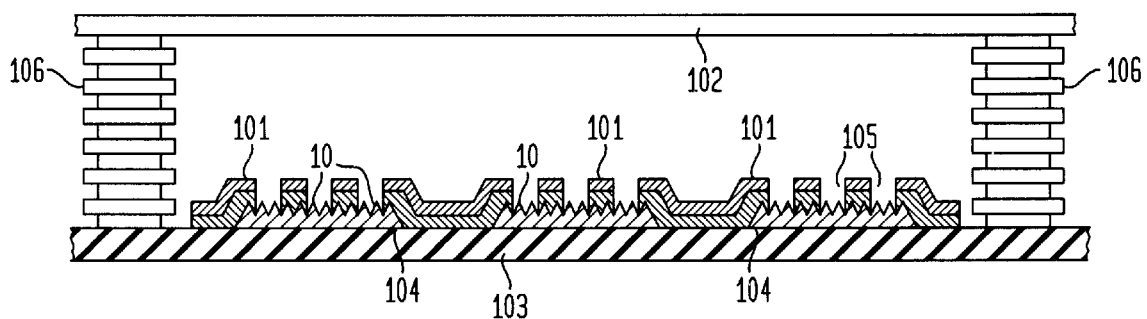
FIGS. 7–14 illustrate a variety of field emission devices using the metallized nanostructure assemblies of the invention.

FIG. 7 schematically illustrates a generalized field emission device 100 comprising a nanowire assembly and a grid structure 101 formed adjacent the nanowire assembly. The grid 101 is a conductive element placed between the electron emitting assembly and an anode 102. The grid is separated from the cathode 103 but is placed sufficiently close to the nanowire emitter assembly to excite emissions (typically within is 10 µm of the emitting nanowire tips). This close spacing is possible only if the emitter tips have relatively uniform height.

The grid 101 is generally separated from the cathode 103 by an electrically insulating spacer layer 104 such as aluminum oxide or silicon dioxide. Advantageously, the grid comprises an electrically conducting layer, e.g., a thin film or thin foil, with a multitude of apertures 105. Within each aperture, a multiplicity of nanowires 10 emit electrons when a field is applied between the cathode and the grid. Insulating spacers 106 keep the anode and cathode spaced apart.

The dimension of the grid apertures 105 is typically in the range of 0.05–100 µm in average maximum dimension (e.g., diameter), advantageously at least 0.1 µ, and more advantageously at least 0.2 µm for ease of manufacturing. The average maximum dimension is advantageously no more than 20 µm, more advantageously no more than 5 µm in order to increase the density of grid apertures and to reduce the voltage necessary to achieve electron emission. Circular apertures are advantageous in that they provide a desirable collimated electron beam with relatively low perpendicular momentum spread. The thickness of the grid conductor is typically in the range of 0.05–100 µm, advantageously 0.05–10 µm. The grid conductor material is typically chosen from metals such as Cu, Cr, Ni, Nb, Mo, W or alloys thereof, but the use of conductive ceramic materials such as oxides, nitrides, and carbides is also possible. The apertured (or perforated) grid structure is typically prepared by conventional thin film deposition and photolithographic etching. Advantageously the grid is a high density apertured gate structure such as described in U.S. Pat. Nos. 5,681,196 and 5,698,934, which are hereby incorporated herein by reference. The combination of very fine nanowire emitters with a high-density gate aperture structure is particularly advantageous.

Such a high density gate aperture structure is conveniently formed using the particle mask techniques described in the aforementioned U.S. Pat. No. 5,681,196 patent. Specifically, after formation of the nanowire emitter structure, mask particles (metal, ceramic, or plastic particles typically having maximum dimensions less than 5 µm and advantageously less than 1 µm) are applied to the emitter surface, e.g., by spraying or sprinkling. A dielectric film layer such as $SiO_2$ or glass is deposited over the mask particles as by evaporation or sputtering. A conductive layer such as Cu or Cr is then deposited on the dielectric while maintaining the mask particles in place. Because of the shadow effect, the emitter areas underneath each mask particle have no dielectric film. The mask particles are then easily brushed or blown away, leaving a gate electrode having a high density of apertures.

Figure 8:
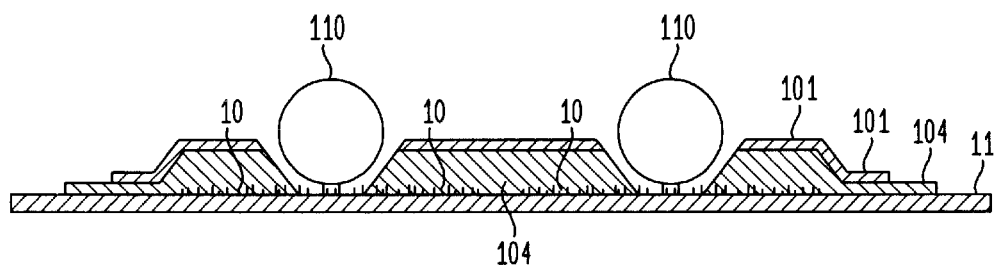

FIG. 8 illustrates fabricating an emitter grid structure using the such a particle mask technique. The mask particles 110 are located above the protruding nanowire emitters 10. Upon deposition of the insulating layer 104 and the grid conductor layer 101, the mask particles 110 block portions of the nanowire emitters 10. When the mask particles 110 are removed, nanowires 10 are exposed through the resultant apertures. The resultant structure is then capable of being incorporated into a device.

Figure 9:
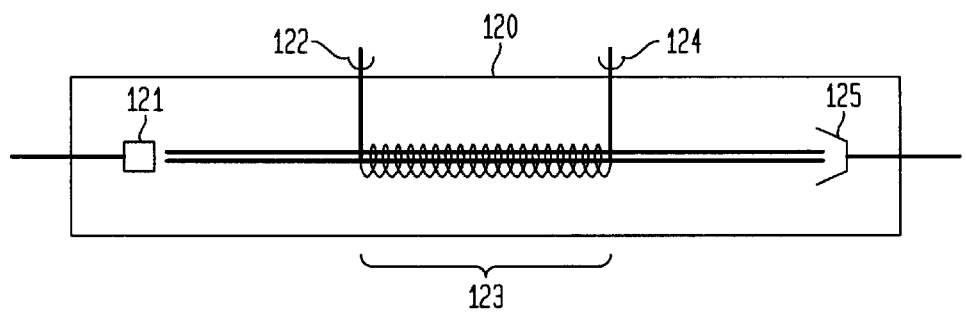

FIG. 9 is a schematic cross section of a microwave vacuum tube amplifier device—here a traveling wave tube (TWT) using the improved nanowire assemblies. The tube device contains an evacuated tube 120, a source of electrons within the tube in the form of an electron gun 121, an input window 122 for introducing a microwave input signal, an interaction structure 123 within the tube where the electrons interact with the input signal and a microwave output window 124 where microwave power derived from the electrons is taken out of the tube. In the case of a TWT, other desired components typically include a focusing magnet (not shown) to focus the beam of electrons through the interaction structure 123, a collector 125 to collect the electron beam after the output microwave power has been generated and an internal attenuator (not shown) to absorb microwave power reflected back into the tube from mismatches in the output. For a TWT, the interaction region 123 is typically a conductive helix for broadband applications and a coupled-cavity region for high power applications. The electron gun 121 is an electron source that generates, accelerates and focuses an electron beam to follow a desired trajectory after it leaves the gun.

Figure 10:
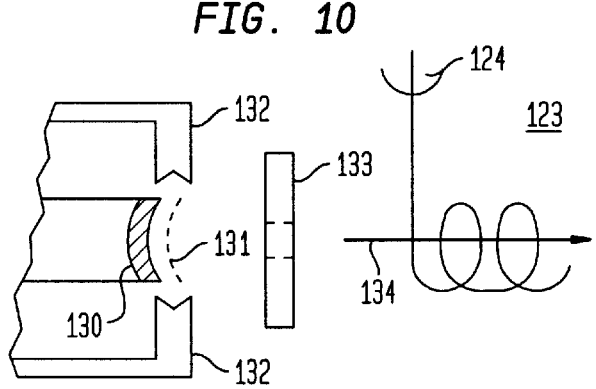

FIG. 10 schematically illustrates a conventional electron gun comprising a thermionic cathode 130, one or more grids 131 for inducing emission of electrons, focusing electrodes 132 for focusing the electrons into a beam, and apertured anode 133 for further directing the beam 134 into interaction structure 123. For TWT applications, a long, thin electron beam at relatively low voltage and high current density is advantageous. Electron guns range in configuration from a planar cathode faced by a planar anode to more elaborate designs such as Pierce guns, conical diode electrodes, concentric cylinders or spherical cap cathodes.

The cathode 130 and grid 131 are the source of electrons for the electron beam in the TWT of FIG. 9. The cathode advantageously has the following properties and capabilities: (1) exhibit a surface able to emit electrons freely without the necessity of external excitation such as heating or bombardment, (2) supply a high current density, (3) long operating life with its electron emission continuing substantially unimpaired, (4) allow production of a narrow beam with a small spread in electron momentum, and (5) allow production of a modulated electron beam at or near the cathode. In contrast to conventional thermionic cathodes, cold cathodes comprising improved nanowire emitter assemblies exhibit these properties. Specifically, nanowire-based cold cathodes are capable of fast, room-temperature emission when an electric field is applied. They allow the production of a modulated electron beam over a distance of a few microns (as in the case of beam modulation performed directly by the grids), permitting the use of a shortened interaction region in the TWT tube design and resulting in a lighter, more compact device.

In operation of the device shown in FIGS. 9 and 10, an electron beam 134 is accelerated from the cathode 130 by high voltages applied to grids 131 and anode 133. The electron beam is then shot into the interaction structure 123 where it interacts with the microwave input signal such that the beam 134 is amplified as the electrons and the signal travel together through the interaction structure 123. The electrons advantageously travel at the same velocity as the microwave signal on the interaction structure 123. The power of the input signal modulates the electron beam 134, and the modulated electron beam 134 generates an amplified form of the input signal at the output 124.

When using nanowire-based cold cathodes in microwave vacuum tube devices, it is desired to keep electron beam spread within a reasonable level. Electrons emerge from the cathode surface with a nonzero velocity and at various angles to the surface normal. The field-emitted electrons thus have a distribution of momentum values in the direction of electron beam trajectory. These effects—random emission of electrons, undesirable momentum perpendicular to the path from the cathode to the anode and the resulting crossing of electron trajectories on the microscopic scale—all reduce the performance of the microwave amplifier by giving rise to shot noise as well as the minimum diameter that a convergent beam can attain. It is therefore desirable to inhibit electron beams from different apertures in the grid from merging unless the electron beams are nearly parallel. Specifically, if the beams merge while individually diverging, the phase space density of the resultant beam will be lowered, because at any given point electrons are found with a variety of different momenta.

It is possible to reduce the divergence angle of the electrons from each aperture by creating an electrostatic lens in the aperture. However, Liouville's Theorem constrains the extent to which a lens is able to reduce the perpendicular momentum spread. If the emitting area is equal to the lens aperture, then no substantial improvement is obtained. If the emitting area is smaller than the lens aperture, it is possible to reduce the perpendicular momentum distribution (with proper lens design) by the ratio of the radius of the emitting area to the radius of the lens.

It is therefore desirable to allow emission only from small spots near the center of each aperture, i.e. at most 70% of the area and advantageously at most 50% of the area of the aperture. It is possible to control the emission by patterning the substrate so that for a plurality of the emitting apertures, only a small area (smaller than the aperture area) is electrically conductive. It is also possible to control emission by controlling the nanowire incorporation process such that only the central area within the emitting aperture is activated and emits electrons, e.g., by depositing a non-emissive overlayer on the nanowire emitters everywhere but at the center of the apertures.

Figure 11:
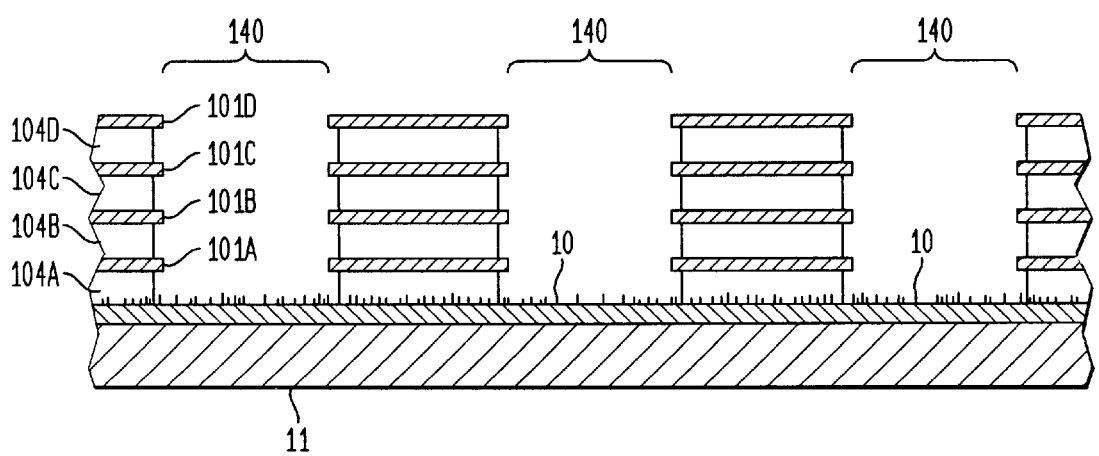

The invention provides an improved technique for reducing the divergence angle. According to the invention, a multilayer, apertured grid is used in which the first grid is operated at a negative potential. The multilayer grid structure has at least two layers and advantageously at least 4 layers of grid conductors, as illustrated in FIG. 11. Grid conductors 101A, 101B, 101C, 101D are separated by insulators 104A, 104B, 104C, 104D, and define aligned apertures 140. Nanowire emitters 10 located within each aperture 140 are supported by a cathode conductor 141, which is located on a substrate 11. The grid conductors 101A–101D allow the electron beams to be focused during traveling. The first grid layer closest to the emitters (101A) is generally biased negative to reduce the perpendicular momentum through suppression of field emission near the edge of the grid apertures 140. A negative bias on the first grid also focuses a diverging electron beam into one that has momenta more nearly parallel to the surface normal. (A single grid provides similarly useful properties if the field applied by the anode is sufficiently large to force emission even in the presence of negative charged grid. However, multiple grids are advantageous in reducing the required voltage on the anode, and in providing a better collimated electron beam.)

The first grid is typically 0.05 to 10 of its average maximum aperture dimension (e.g., diameter in the case of round apertures) above the cathode, advantageously 0.3 to 2. Typically, the apertures are round and have a diameter of 0.05 to 100 $\mu$m, advantageously at least 0.1 $\mu$, more advantageously at least 0.2 $\mu$m. This first grid reduces the electric field at the cathode surface, near the edge of the hole, and thereby suppresses emission preferentially from the edge. Successive grids typically exhibit positive voltages relative to the cathode.

The multilayered grid structure can be prepared by conventional thin film deposition and photolithographic techniques. It is also possible to prepare the grid structures of FIG. 11 by a particle mask technique as discussed previously and illustrated in FIGS. 12 and 13. The thickness of the grid conductor layers 101A–101D is typically in the range of 0.05 to 100 $\mu$m, advantageously 0.1 to 10 $\mu$m. The grid conductor layers are generally selected from a metal such as Cu, Cr, Ni, Nb, Mo, W, or alloys thereof, but the use of conductive ceramics such as oxides, nitrides, and carbides is also possible. The insulator layers 104A–104D are typically formed from materials such as silica or glass.

Figure 12:
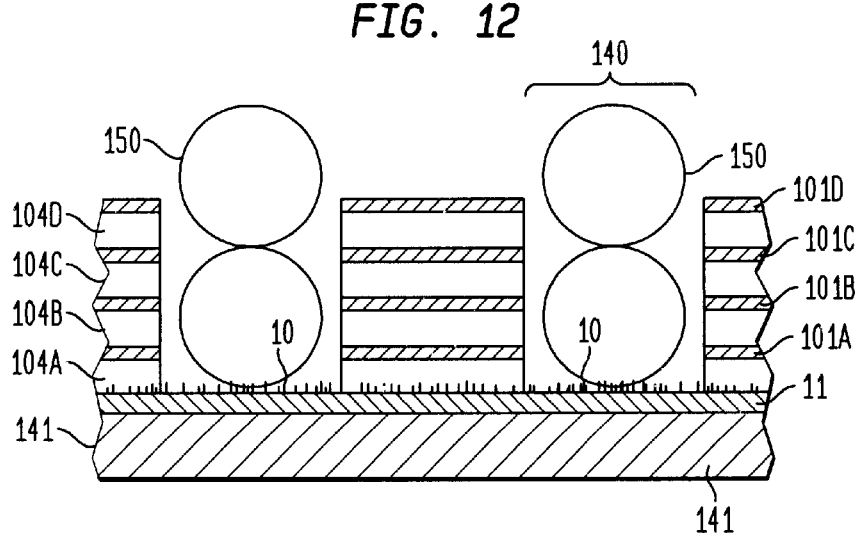

In FIG. 12, the mask particles 150 are typically ferromagnetic (e.g. Fe, Ni, Co, or their alloys). Desirable particle size is typically in the range of 0.1–20 $\mu$m in average diameter. During the placement of the particles, e.g. by sprinkling onto the nanowire emitter structure, a vertical magnetic field is applied, which causes the ferromagnetic particles 150 to form a vertically elongated chain-of-spheres containing at least 2 particles. Some chains-of-spheres may have more particles than others, but this does not affect the process of depositing the multilayer grid structure. After alternating deposition of insulating spacer film (104A–104D) and the grid conductor film (101A–101D) into multilayer stacks, the magnetic field is removed. The ferromagnetic particles 150 are then also removed, e.g., by magnetically pulling away from above using a permanent magnet or electromagnet, or by chemical etching.

Figure 13:
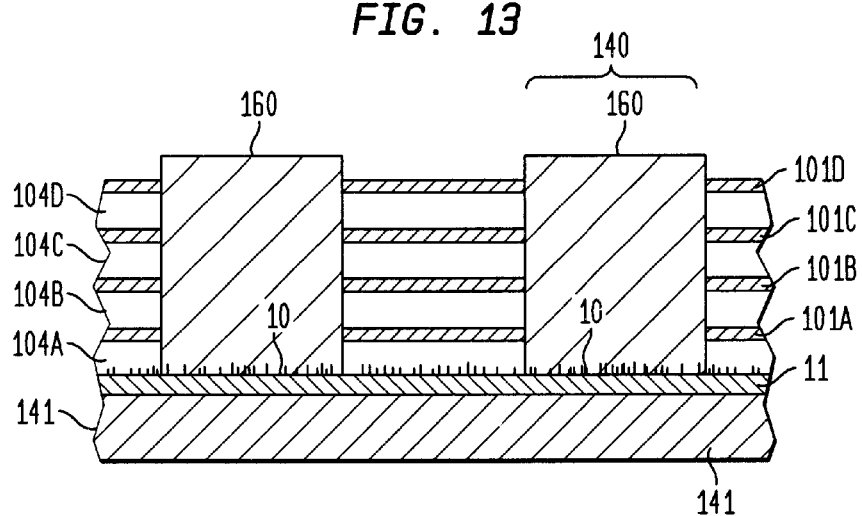

An alternative particle mask approach is schematically illustrated in FIG. 13. In this approach, elongated or prolate ferromagnetic particles 160 are sprinkled in the presence of vertical magnetic field so that they stand up vertically due to shape anisotropy and to serve as mask particles during the subsequent deposition of the multilayer grid structure (100A–100D and 101A–101D), conductor layer 11 and nanowire emitters 10. For convenience, the conductor/nanowire assembly can be supported on a larger substrate 141.

The elongated mask particles 160 typically have an average axial maximum dimension, e.g., diameter, in the range of 0.1–20 $\mu$m, and a length to diameter aspect ratio of at least 2. It is possible to prepare the particles 160, for example, by thin film deposition (e.g. by sputtering, evaporation, electroless plating) of the mask material through a perforated template (not shown) placed at a desired height above the nanowire emitter layer. Suitable materials for this type of elongated mask particles 160 include metals such as Cu, Al, Ni, easily water or solvent dissolvable polymers (e.g., polyvinyl acetate, polyvinyl alcohol, polyacrylamide, acrylonitrile-butadiene-styrene or ABS), volatile polymers (e.g., PMMA), or easily dissolvable salts (e.g., NaCl). After deposition of the particles, the template is removed, and the multilayer grid structure is formed by deposition over the mask particles. The mask particles are then dissolved away to expose the aperture.

The cathode and gate structure of FIG. 11, as used in a microwave amplifier, is not necessarily flat in surface geometry. It is possible to use a reshaped bulk nanowire composite emitter, or a curved substrate having thin film array emitters deposited thereon. The curved substrate is prepared, for example, by etching or mechanical polishing (e.g., in the case of materials such as Si) or by plastic deformation (e.g., in the case of ductile metals such ad Cu, Mo, Nb, W, Fe, Ni, or alloys thereof).

Advantageously, the nanowire-containing cathode and multilayer grid structure of FIG. 11 is used in a TWT, instead of a thermionic emission cathode. Also, the cathode/grid structure of FIG. 11 is advantageously slightly concave for the purpose of focusing the emitted electrons into a beam.

The nanowire emitter structures of FIGS. 10 and 11, reduce the perpendicular momentum spread of electrons emitting from the cathode due to four features. (1) Low voltage emission is conducive to reduced beam spreading. If the emitter geometry is held constant, the perpendicular momentum spread scales as the square root of the emission voltage. The use of field-concentrating, protruding nanowire emitters prepared according to the invention allows low voltage emission and hence reduced perpendicular momentum in microwave amplifier operation. (2) Electron emission is restricted to the central area portion, which is much smaller than the entire grid aperture area. (3) The electron beam is focused by the stack of the multilayer grid structure. (4) A concave substrate further focuses the electron beam.

It is also possible to use the nanowire-based emitters of the invention to fabricate a flat panel, field emission display. Such a field emission display is constructed, for example, with a diode design (i.e., cathode-anode configuration) or a triode design (i.e., cathode-grid-anode configuration). Advantageously, a grid electrode is used, more advantageously a high density aperture gate structure placed in proximity to the nanowire emitter cathode, as discussed previously.

For display applications, emitter material (the cold cathode) in each pixel of the display desirably consists of multiple emitters for the purpose, among others, of averaging out the emission characteristics and ensuring uniformity in display quality. Because of the nanoscopic nature of the carbon nanowires, the emitter provides many emitting points, typically more than 1 emitting tips per pixel of $100 \times 100 \mu m^2$, assuming 0.01–1% areal density of nanowires with a tubular diameter of 5–100 nm. Advantageously, the emitter density in the invention is at least $1/\mu m^2$, more advantageously at least $10/\mu m^2$. Because efficient electron emission at low applied voltage is typically achieved by the presence of accelerating gate electrode in close proximity (typically about 1 micron distance), it is useful to have multiple gate apertures over a given emitter area to utilize the capability of multiple emitters. It is also desirable to have fine-scale, micron-sized structure with as many gate apertures as possible for increased emission efficiency.

Figure 14:
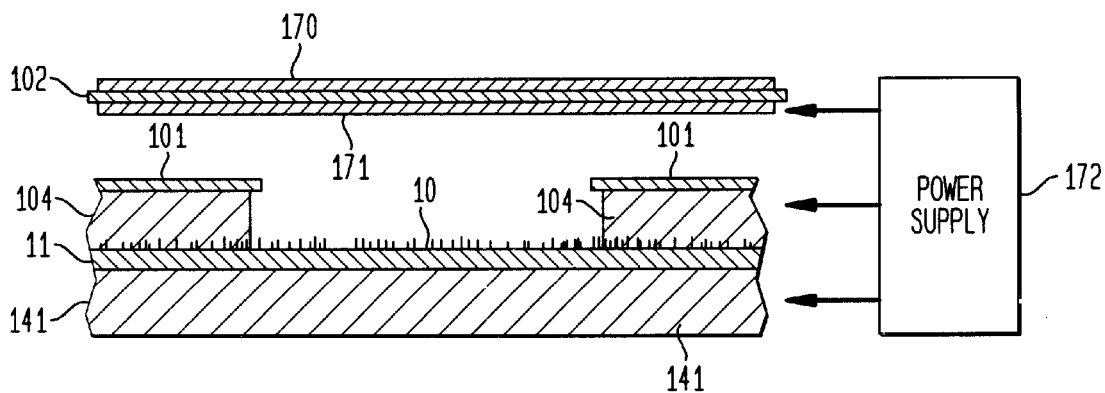

FIG. 14 illustrates a flat panel field emission display using the nanowire emitter structure of the invention. The display contains a cathode 11 including a plurality of nanowire emitters 10 and an anode 102 disposed in spaced relations from the emitters 10 within a vacuum seal. The anode conductor 102 formed on a transparent insulating substrate 170 is provided with a phosphor layer 171 and mounted on support pillars (not shown). Between the cathode and the anode and closely spaced from the emitters is a perforated conductive gate layer 101. Conveniently, the gate 101 is spaced from the cathode 11 by an insulating layer 104.

The space between the anode and the emitter is sealed and evacuated, and voltage is applied by power supply 172. The field-emitted electrons from the nanowire emitters 10 are accelerated by the gate electrode 101, and move toward the anode conductor layer 102 (typically a transparent conductor such as indium-tin oxide). As the accelerated electrons hit the phosphor layer 171, a display image is generated.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. In an assembly of carbon nanotubes comprising a substrate and a plurality of carbon nanotubes attached to the substrate, the carbon nanotubes extending from a substrate surface outward of the substrate to tips and having diameters in the range 1.0–100 nm and lengths in the range 0.5–100 $\mu m$;

the improvement wherein a metallic film covers the carbon nanotubes from the substrate to the tips of the nanotubes to form continuous conductive paths.

2. The assembly of claim 1 wherein the metallic film comprises a metal or metal alloy having a melting point $\geq 1400°$ C.

3. The assembly of claim 1 wherein the metallic film comprises a metal or metal alloy having a melting point $\geq 1800°$ C.

4. The assembly of claim 1 wherein the metallic film covers at least a portion of the substrate.

5. The assembly of claim 1 wherein the substrate comprises non-conducting material and the metallic film covers at least a portion of the substrate.

6. The assembly of claim 1 wherein the carbon nanotubes are aligned substantially perpendicular to the substrate with an average variation from the perpendicular direction of less than 25°.

7. The assembly of claim 1 wherein the carbon nanotubes extend from substrate by substantially equal heights with an average variation in height of less than 10%.

8. In an electron field emitting device comprising a cathode, a plurality of field emitter tips, a grid spaced relatively closely to the emitter tips and an anode spaced relatively father from the tips, the improvement wherein the field emitting device comprises the assembly of claim 1 with substrate of the assembly comprising the cathode and the tips of the carbon nanotubes comprising the emitter tips.

9. In a microwave vacuum tube amplifier comprising an evacuated tube, a source of electrons within the tube, an input for a microwave signal, an interaction structure within the tube for interacting the input signal with electrons and an output for an amplified microwave signal;

the improvement wherein the electron source comprises a field emitting device according to claim 8.

10. In a display device comprising a cathode including a plurality of electron emitters, an anode disposed in spaced relation to the emitters, the anode including a phosphor layer, and a gate disposed between the emitters and the anode, the improvement wherein the display device comprises the assembly of claim 1 with the substrate of the assembly comprising the cathode and the tips of the carbon nanotubes comprising the emitters.

* * * * *